United States Patent
Collet et al.

(10) Patent No.: US 6,769,251 B2
(45) Date of Patent: Aug. 3, 2004

(54) HYDRAULIC SYSTEM ARCHITECTURE FOR CONTROLLING STEERING

(75) Inventors: Olivier Collet, Palaiseau (FR); Emmanuel Dorget, Puteaux (FR); Claire Patrigeon, Bièvres (FR); Daniel Bucheton, Le Chesnay (FR)

(73) Assignee: Messier-Bugatti, Velizy Villacoublay (FR)

( * ) Notice: Subject to any disclaimer, the term of this patent is extended or adjusted under 35 U.S.C. 154(b) by 6 days.

(21) Appl. No.: 10/360,657

(22) Filed: Feb. 10, 2003

(65) Prior Publication Data

US 2003/0163989 A1 Sep. 4, 2003

(30) Foreign Application Priority Data

Mar. 4, 2002 (FR) ............................................ 02 02693

(51) Int. Cl.[7] .............................................. F16D 31/02
(52) U.S. Cl. ........................................... 60/405; 60/476
(58) Field of Search .......................... 60/404, 405, 417, 60/476

(56) References Cited

U.S. PATENT DOCUMENTS

| 2,874,793 | A | | 2/1959 | Wagner | |
|---|---|---|---|---|---|
| 3,940,931 | A | * | 3/1976 | Renfro et al. | 60/405 |
| 3,958,657 | A | * | 5/1976 | McBurnett | 60/405 |
| 4,114,720 | A | * | 9/1978 | Ericson et al. | 60/405 |
| 4,422,290 | A | * | 12/1983 | Huffman | 60/405 |
| 4,574,904 | A | * | 3/1986 | Goode | 60/404 |
| 6,568,499 | B2 | * | 5/2003 | Nakazawa et al. | 180/422 |

FOREIGN PATENT DOCUMENTS

| DE | 100 4 0870 | 5/2001 |
|---|---|---|
| DE | 100 3 7829 | 2/2002 |
| GB | 139 4808 | 5/1975 |
| WO | WO 01 19664 | 3/2001 |
| WO | WO 021 2052 | 2/2002 |

* cited by examiner

*Primary Examiner*—Thomas E. Lazo
(74) *Attorney, Agent, or Firm*—Sughrue Mion, PLLC

(57) ABSTRACT

The invention relates to an architecture for a hydraulic steering control system including at least one actuator; the hydraulic system comprises a directional-control valve connected to a pressure-generator device and to an associated main supply, the hydraulic system further comprising a reversible electrically-driven pump unit having two ports and being fitted with a general selector arranged, in a normal mode of operation, to put the chambers of the actuator into communication with the directional-control valve, and in an alternate mode of operation to put the chambers of the actuator into communication with the ports of the pump unit. A compensation device makes it possible in the alternate mode to compensate for any flow differential between the flow drawn in by the pump unit from one of the chambers of the actuator and the flow delivered by the pump unit into the other chamber of the actuator.

9 Claims, 1 Drawing Sheet

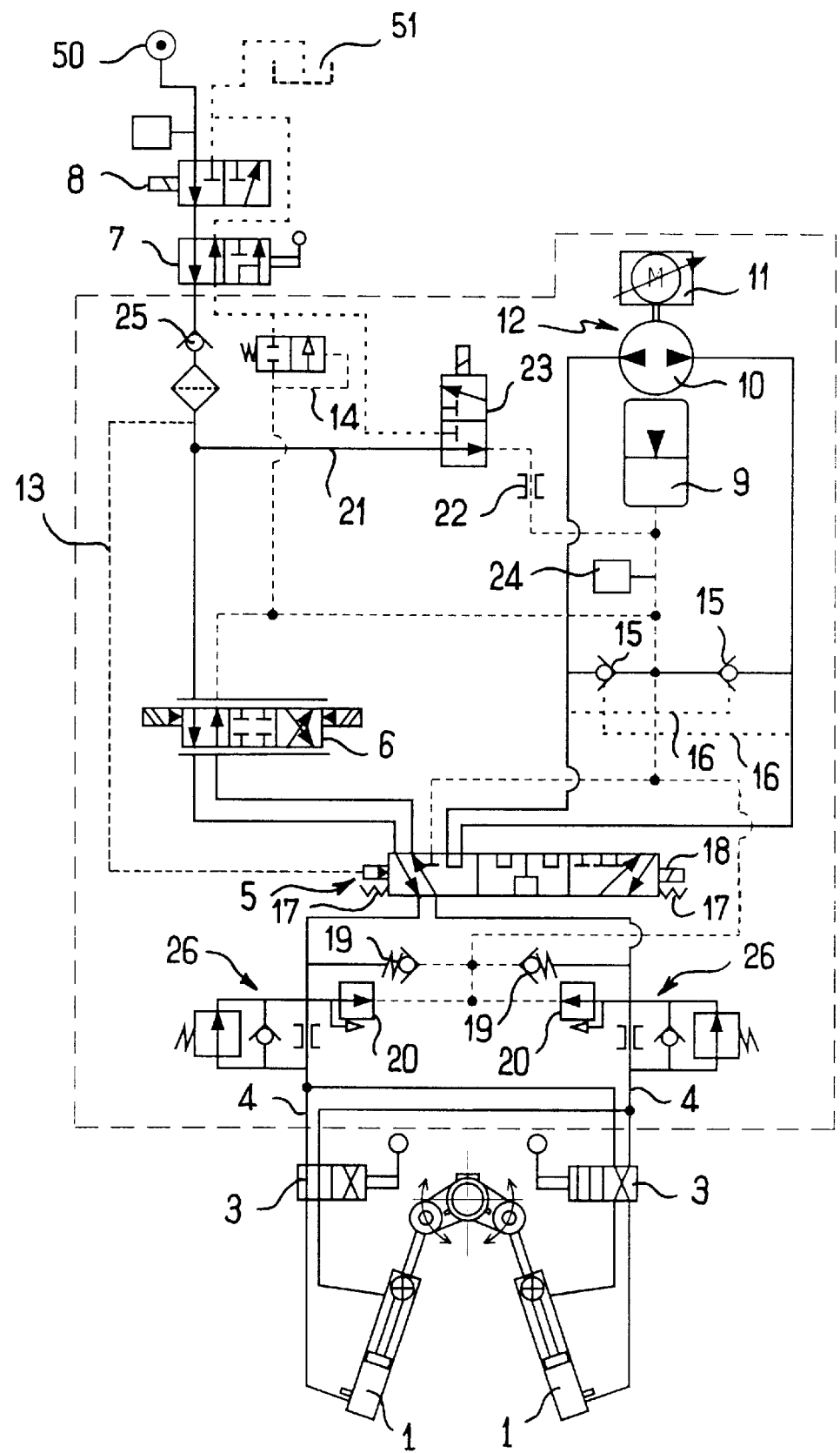

HYDRAULIC SYSTEM ARCHITECTURE FOR CONTROLLING STEERING

FIELD OF THE INVENTION

The invention relates to an architecture for a hydraulic steering control system, intended in particular for fitting to an aircraft.

BACKGROUND OF THE INVENTION

Aircraft generally include nosewheel landing gear having one or more wheels that are steerable in order to enable the aircraft to be taxied. For aircraft of large size, one or more steerable bogies are sometimes provided on the main landing gear, in addition to the steering device for the nose landing gear.

The steerable portions of landing gear are generally actuated by one or more actuators fed by the pressure-generator device of the aircraft via a hydraulic steering block situated close to the actuators, as a general rule directly on the landing gear. In conventional manner, the hydraulic steering block comprises a directional control valve, generally of the proportional type, serving to deliver fluid to the actuator(s) so as to control the steering of the steerable portion of the landing gear in response to orders from the pilot.

Steering is generally not considered as being a function that is critical from the point of view of aircraft safety. Loss of steering does not lead to catastrophic consequences, and the steering function can be compensated by differential braking, optionally associated with differential thrust from the engines. If necessary, the aircraft can be towed.

It is therefore common practice for the hydraulic steering block to be fed solely by the main hydraulic circuit of the aircraft, the hydraulic block being arranged to allow the steerable portion of the landing gear to turn freely when the aircraft is stationary or in the event of the pressure-generator device not operating.

Nevertheless, the loss of the steering function can interfere severely with aircraft operation. Controlling an aircraft that is taxiing by differential braking does not enable it to make sharp turns, and for aircraft of large size that is not necessarily compatible with the width available on taxiways. Furthermore, making sharp turns by blocking the wheels of the main landing gear on one side of the aircraft stresses said landing gear strongly in twisting which reduces its lifetime. In addition, requiring the use of a tractor to tow the aircraft can waste a great deal of time, and that can disturb the running of an airport in unacceptable manner.

In a conventional technique, the reliability of the steering function can be increased by duplicating the main feed circuit by means of an emergency feed circuit.

However, that solution when applied to the present situation presents numerous drawbacks. On large airliners, the hydraulic steering block of the nose landing gear is remote from the pressure-generator device of the aircraft by a distance of several tens of meters, and duplicating the pipework would give rise to harmful extra weight. Furthermore, segregation requirements make it essential for the main and emergency circuits to follow different paths through the structure of the aircraft, thereby complicating aircraft design.

In addition, the breakdown can come from the hydraulic block itself, and in particular from the directional-control valve. Duplicating the feed circuit in the conventional technique does not enable that breakdown to be remedied.

The state of the art is also illustrated by the following documents: WO-A-02/12052; WO-A-01/19664; GB-A-1 394 808; U.S. Pat. No. 2,874,793; DE-A-100 37 829; and DE-A-100 40 870.

Document WO-A-02/12052 describes a steering system architecture in which a steering actuator is fed in a normal mode of operation by a main pump via a directional-control valve, and under fault conditions by a reversible pump. No genuine alternate mode of operation is provided. For example, a breakdown can arise in which both pumps are delivering simultaneously into the actuator. In addition, if the main pump breaks down, there is no provision against the directional-control valve breaking down.

Document WO-A-01/19664 describes another architecture in which the normal and alternate modes of operation are provided by two reversible pumps. Thus, in the event of failure, those two pumps could likewise both deliver into the chambers of the actuator.

Document GB-A-1 394 808 describes another architecture in which the two modes of operation alternate only in the event of the main pump failing, without it being possible to cope with some other component of the hydraulic circuit failing.

Document U.S. Pat. No. 2,874,793 describes another architecture with manually operable valves to release the steerable portions so as to allow them to turn freely.

Document DE-A-100 37 820 describes yet another architecture having electrically-driven pumps connected to respective independent circuits. No means are provided to compensate for differential flows.

Document DE-A-100 40 870 describes an architecture that is complex, having two actuators in series, each possessing its own feed means.

OBJECT OF THE INVENTION

The invention seeks to provide good reliability for the steering function of an aircraft but without suffering the drawbacks or limitations of the solutions described above.

BRIEF SUMMARY OF THE INVENTION

The architecture for a hydraulic steering control system of the invention includes at least one steering control actuator having chambers, the hydraulic system comprising a directional-control valve connected to a pressure-generator device and an associated main supply, the hydraulic system further comprising a reversible electrically-driven pump unit having two ports, and the hydraulic system being fitted with a general selector arranged in a normal mode of operation to put the chambers of the actuator into communication with the directional-control valve, and in an alternate mode of operation to put the chambers of the actuator into communication with the ports of the pump unit, a compensation device making it possible in the alternate mode to compensate for the flow differential between the flow taken in by the pump unit from one of the chambers of the actuator and the flow delivered by the pump unit to the other chamber of the actuator.

Thus, in the event of the pressure-generator device of the aircraft breaking down, or in the event of the directional-control valve failing, the electrically-driven pump unit takes over to allow the aircraft to be steered.

By means of the hydraulic system of the invention, it is possible to overcome not only a breakdown of the generator device, but also a failure of the directional-control valve, without it being necessary to duplicate the main feed circuit.

Advantageously, the general selector is further arranged, in a passive, towing mode, to put the chambers of the actuator into communication with one another, the compensation device then compensating for any possible flow differential between the chambers of the actuator in the event of a maneuver being imposed on the actuator.

Passive mode allows the aircraft to be towed, the steerable portion of the landing gear then being free to turn without the actuator opposing such turning.

The compensation device is used both to compensate for flow rate differences between the ports of the electrically-driven pump unit when it is in operation, and for flow rate differences between the chambers of the actuators in passive mode.

This disposition makes it possible to avoid using an accumulator dedicated to the second above-mentioned compensation, as has been the practice in the prior art.

In a particular embodiment, the compensation device comprises a pressurized tank connected to each of the ports of the pump unit via an associated check valve making it possible during operation in alternate mode for hydraulic fluid to be transferred from the pressurized tank to one of the ports of the pump unit, and vice versa, each check valve being capable of being placed in a permanently open position by a respective pressure signal taken from the opposite port of the pump unit.

Also advantageously, the compensation device further comprises check valves connecting each of the chambers of the actuator to the pressurized tank to enable hydraulic fluid to be transferred from the pressurized tank to the chamber of the actuator concerned. The compensation device further comprises pressure-relief valves connecting the pressurized tank to each of the chambers of the actuator to enable hydraulic fluid to be transferred from the chamber concerned to the pressurized tank.

Preferably, the pressurized tank is connected to the pressure-generator device via a constriction to enable the pressurized tank to be filled. It is also advantageously connected to the main supply via a pressure-relief valve.

In an aspect of the invention, a bleed valve is arranged to enable the pressurized tank to be emptied into the main supply so as to enable the fluid in said tank to be renewed periodically.

Finally, the pressurized supply is preferably fitted with a pressure sensor.

Other characteristics and advantages of the invention appear more clearly in the light of the following description of a particular, non-limiting embodiment of the invention.

BRIEF DESCRIPTION OF THE DRAWING

Reference is made to the sole FIGURE of the accompanying drawing which is a diagram of an architecture of the invention for a hydraulic steering system associated with landing gear, the architecture being shown in a position that corresponds to its normal mode of operation.

DETAILED DESCRIPTION OF THE INVENTION

With reference to the FIGURE, and in conventional manner, the steerable portion of the landing gear (not shown) is actuated by means of two actuators 1 disposed in conventional manner in a push-pull configuration. In this configuration, one of the portions of each actuator (in this case its cylinder) is mounted to pivot relative to the landing gear about an axis parallel to the steering axis of the steerable portion of the landing gear, and the other portion of each actuator (its rod) is mounted to pivot on the steerable portion of the landing gear about an axis that is parallel to the two above-mentioned axes.

The two actuators 1 are fed via rotary directional-control valves 3 which serve to switch over appropriately the hydraulic feed and return to the chambers of the associated actuators 1 whenever an actuator passes through a position in which all three axes corresponding thereto are contained in the same plane.

Depending on the angular position of the steerable portion of the landing gear, the two actuators 1 may push together, pull together, or work in differential or "push-pull" manner. Regardless of its angular position, each actuator chamber is connected to one of the chambers of the other actuator, so that the actuators 1 can be considered from the hydraulic point of view as behaving as a single double-acting actuator.

The actuators 1 are fed via two distribution lines 4 coming from the outlet of a slide valve 5. Damping valves 26 (known as "anti-shimmy" valves) are fitted to each of the distribution lines 4 to damp any oscillating motion to which the steerable portion of the landing gear might be subjected, in order to avoid any harmful coupling between such oscillatory motion and resonant modes of the landing gear.

The slide valve 5 has five inlets and three positions which define three mode of operations for the steering system, namely: a normal mode of operation (as shown); a passive mode (not shown); and an alternate mode of operation (not shown).

The first and second inlets of the slide valve 5 are connected to the outlet ports of a proportional directional-control valve 6, the inlet ports of the proportional directional-control valve 6 being connected to the pressure-generator device 50 of the aircraft and to the main supply 51 of the aircraft via, in succession: a mechanically-controlled isolating valve 7; and an electrically-controlled isolating valve 8.

The third inlet of the slide valve 5 is connected to a pressurized tank 9 which is maintained at a rated pressure by a rating valve 14. It should be observed that the pressurized tank 9 is connected to the pressure-generator device 50 of the aircraft via a branch connection 21 which enables the pressurized tank 9 to be kept full. A constriction 22 placed in the branch connection 21 serves to limit the flow rate of fluid coming from the pressure-generator device 50 of the aircraft.

A check valve 25 that is placed upstream of the branch connection 21 serves to prevent the pressurized tank 9 emptying via the branch connection 21 in the event of a break in the line coming from the pressure-generator device 50 of the aircraft. In addition, a bleed valve 23 is placed on the branch connection 21 in order to enable the pressurized tank 9 to be emptied, either during a maintenance operation, or else during automatic procedures for verifying proper operation of the hydraulic system in flight or on the ground. This makes it possible in particular to act periodically to renew the fluid contained in the pressurized tank 9 while avoiding any need to provide any special filter device. A pressure sensor 24 makes it possible at any time to be aware of the pressure that exists in the pressurized tank 9.

Finally, the fourth and fifth inlets of the slide valve 5 are connected to two ports of a reversible pump 10 of fixed cylinder capacity driven by a variable speed electric motor 11, together forming an electrically-driven pump unit 12.

The hydraulic steering system of the invention operates as follows.

While the pressure-generator device 50 of the aircraft is functioning normally, a branch connection 13 (which is thus under pressure) enables the slide valve 5 to be pushed into a position corresponding to operation in normal mode (as shown in the FIGURE).

In this position, the slide valve 5 connects its two outlets to its first two inlets so that the distribution lines 4 are connected to the outlet ports of the proportional directional-control valve 6. This valve then delivers fluid to the chambers of the actuators 1 in response to the action of the pilot in such a manner as to cause the steerable portion of the landing gear to take up the angular position determined by the pilot.

The third inlet of the slide valve 5 is closed, while the fourth and fifth inlets are short-circuited so that if the electrically-driven pump 12 starts to operate, whether intentionally or inadvertently, the flow delivered via one of the ports of the pump unit 12 is returned to the other port.

To compensate for any possible differences in flow rate between the two ports of the pump unit 12, the pressurized tank 9 is connected to the two ports of the pump unit 12 via associated piloted check valves 15 which enable fluid to be transferred to the pressurized tank 9 if the flow drawn in by the pump is less than the flow delivered by the pump.

Furthermore, the check valves 15 are controlled by respective pressure signals 16 taken from the other port, thereby forcing the valve 15 concerned to remain open so as to allow excess fluid to be transferred into the pressurized tank 9.

When the pressure-generator device 50 of the aircraft is stopped, centering springs 17 return the slide valve 5 to its passive mode position (which corresponds to the central box in the diagram representing the slide of the valve 5 in the FIGURE).

In this mode, the first and second inlets to the slide valve 5 are short-circuited, so that any intentional or inadvertent actuation of the proportional directional-control valve 6 has no effect on the actuators 1.

The fourth and fifth inlets of the slide valve 5 are also short-circuited, as in normal operation mode, so that actuating the pump unit 12 likewise has no effect on the actuators 1.

The third inlet is in communication with both outlets of the slide valve 5 so that the chambers in each of the actuators 1 are connected to one another and to the pressurized tank 9.

Thus, while the aircraft is being towed, the steerable portion of the landing gear can turn freely, with fluid contained in any one chamber of the actuators 1 being transferred into the other chambers or into the pressurized tank 9, without any resistance being opposed to turning the steerable portion of the landing gear.

Finally, if in operation it should be detected that the generator device 50 of the aircraft has broken down or that the proportional directional-control valve 6 has failed, then the slide valve 5 is forced by means of a solenoid 18 to take up a third position corresponding to alternate mode operation (which corresponds to the right-hand box in the slide of the valve 5 in the FIGURE), with the solenoid 18 being powerful enough to overcome the action of any residual pressure that might remain in the branch connection 13.

In this mode, the first and second inlets to the slide valve 5 are closed, such that actuating the proportional directional-control valve 6 has no effect on the actuators 1.

The third inlet of the slide valve 5 is also closed, while the fourth and fifth inlets of the slide valve 5 put the ports of the pump unit 12 into communication with respective ones of the distribution lines 4 leading to the actuators 1.

The steerable portion of the landing gear can then be turned by causing the pump unit 12 to operate in the desired direction so as to inject fluid via the appropriate port into one or other of the distribution lines 4, with the fluid that is ejected by the other distribution line 4 then being directed to the other port of the pump unit 12. The pressurized tank 9 then acts as a reserve capacity to absorb or deliver fluid to compensate for differential flow between the ports of the pump unit 12. In alternate mode, the hydraulic fluid therefore circulates around a closed circuit.

This provides means enabling the steering function to be guaranteed even in the event of the pressure-generator device 50 of the aircraft breaking down, or in the event of the proportional directional-control valve 6 failing, and this is achieved without having recourse to an emergency circuit duplicating the main circuit.

In another aspect of the invention, the pressurized tank 9 is connected to each of the distribution lines 4 via check valves 19 which enable a certain quantity of fluid to be transferred from the pressurized tank 9 to the chamber(s) of the actuators 1 concerned, in the event of the pressure in said chambers dropping below the rated pressure of the pressurized tank 9. This disposition avoids cavitation in the chambers of the actuators 1.

In addition, the pressurized tank 9 is connected to each of the distribution lines 4 via pressure-relief valves 20 which enables a certain quantity of fluid to be discharged into the pressurized tank 9 in the event of the pressure in the chambers of the actuators 1 concerned exceeding the pressure to which the pressure-relief valves 20 are set. This disposition protects the actuators 1 against excess pressure.

Thus, the pressurized tank 9 is used not only as a reserve capacity suitable for absorbing or delivering fluid to compensate for differential flow at the ports of the pump unit 12, but also to supply or absorb the flows required for protecting the actuators 1 from cavitation and from excess pressure.

The invention is not limited to the particular embodiment described above, but on the contrary it covers any variant that comes within the scope of the invention as defined by the claims.

In particular, although it is stated that the directional-control valve used is of the proportional type, it is equally possible to envisage any type of directional-control valve that makes it possible to control the flow of fluid into the chambers of the steering actuators, and in particular it is possible to use directional-control devices of the "bang—bang" type, or the equivalent.

Although the architecture of the hydraulic steering system of the invention is shown as being applied to a device for actuating the steerable portion of landing gear in which the device comprises steering actuators mounted in a push-pull configuration, the invention also applies to an actuator device of the type comprising a rack actuated by two terminal pistons each sliding in a chamber, or to an actuator device of the type having a single actuator, or indeed having a rotary hydraulic motor or any equivalent type of actuation.

Although the general selector shown is a slide valve having three positions with five inlets and two outlets, it would naturally be possible to replace the slide valve with an arrangement of a plurality of valves enabling the same switching to be performed as is performed by the slide valve shown.

Finally, although the compensation device is shown as having a pressurized tank that is inflated by the pressure-generator device, it would also be possible to provide a tank that is isolated.

What is claimed is:

1. An architecture for a hydraulic steering control system that includes at least one steering control actuator having chambers, wherein the hydraulic system comprises a directional-control valve connected to a pressure-generator device and an associated main supply, the hydraulic system further comprising a reversible electrically-driven pump unit having two ports, and the hydraulic system being fitted with a general selector arranged in a normal mode of operation to put the chambers of the actuator into communication with the directional-control valve, and in an alternate mode of operation to put the chambers of the actuator into communication with the ports of the pump unit, a compensation device making it possible in the alternate mode to compensate for the flow differential between the flow taken in by the pump unit from one of the chambers of the actuator and the flow delivered by the pump unit to the other chamber of the actuator.

2. An architecture according to claim 1, wherein the general selector is further arranged, in a passive, towing mode, to put the chambers of the actuator into communication with one another, the compensation device then compensating for any possible flow differential between the chambers of the actuator in the event of a maneuver being imposed on the actuator.

3. An architecture according to claim 1, wherein the compensation device comprises a pressurized tank connected to each of the ports of the pump unit via an associated check valve making it possible during alternate mode operation for hydraulic fluid to be transferred from the pressurized tank to one of the ports of the pump unit, and vice versa, each check valve being capable of being placed in a permanently open position by a respective pressure signal taken from the opposite port of the pump unit.

4. An architecture according to claim 3, wherein the compensation device further comprises check valves connecting each of the chambers of the actuator to the pressurized tank to enable hydraulic fluid to be transferred from the pressurized tank to the chamber of the actuator concerned.

5. An architecture according to claim 3, wherein the compensation device further comprises pressure-relief valves connecting the pressurized tank to each of the chambers of the actuator to enable hydraulic fluid to be transferred from the chamber concerned to the pressurized tank.

6. An architecture according to claim 3, wherein the pressurized tank is connected to the pressure-generator device via a constriction to enable the pressurized tank to be filled.

7. An architecture according to claim 3, wherein the pressurized tank is connected to the main supply via a pressure-relief valve.

8. An architecture according to claim 3, wherein a bleed valve is arranged to enable the pressurized tank to be emptied into the main supply so as to enable the fluid in said tank to be renewed periodically.

9. An architecture according to claim 3, wherein the pressurized tank is fitted with a pressure sensor.

* * * * *